INVENTORS
FREDERICK BILD
WILLIAM ROBINSON
By
Cushman, Darby & Cushman

Jan. 24, 1967   F. BILD ETAL   3,300,555
MANUFACTURE OF PLASTIC TUBES
Filed Nov. 12, 1963   3 Sheets-Sheet 2

United States Patent Office 3,300,555
Patented Jan. 24, 1967

3,300,555
MANUFACTURE OF PLASTIC TUBES
Frederick Bild, Highgate, London, and William Robinson, Welwyn Garden City, England, assignors to Imperial Chemical Industries Limited, London, England, a corporation of Great Britain
Filed Nov. 12, 1963, Ser. No. 322,888
Claims priority, application Great Britain, Dec. 3, 1962, 45,467/62
20 Claims. (Cl. 264—95)

This invention relates to improvements in or relating to the manufacture of plastic tubes. It also relates to the manufacture of tubular thermoplastic film and to the film so made.

In British specification No. 787,479 we proposed a process for the continuous production or treatment of tubular film wherein a gas is admitted to the inside of the tubular film by means of a pipe (referred to therein as a tubular probe) passing through the nip of a pair of nip rollers, between which the tubular film is passed, the nip rollers being adapted to allow the passage of the pipe through the nip. Such adaptation may be effected by providing one or both of the nip rollers with grooves into which the pipe fits, which grooves may be filled with sponge rubber to act as a seal.

We have found that if such a process is applied to a thick walled resilient plastic tube rather than to a tubular film (we define a thick-walled resilient plastic tube as one of wall thickness of more than 0.01 inch and of sufficient resilience not to be cracked or unduly deformed in the method of this invention), the tube tends to become creased where it is folded on passage through the nip and the creases form weaknesses in the tube. Further, if the tube is sufficiently thick compared with its diameter, it tends to crack where so folded. A way of overcoming these disadvantages has been proposed in our copending United States Patent No. 3,166,616, wherein there is provided a method of continuously passing a thick-walled resilient plastic tube between nip rollers, in which method the tube is prevented from being wholly flattened at its edges where it passes through the nip by having two stationary probes within the tube, which probes pass through the nip at a position such that they give internal support to the tube at the said edges, so that the tendency of the tube to be creased at the edges is reduced. Such a method, however, requires the use of relatively complicated equipment in that more than one groove must of necessity be formed in the roller surfaces in order to accommodate the probes.

An object of the present invention is to provide a process in which creasing is reduced at least one of the edges of the resilient tube of thermoplastic material and which can be operated with relatively simple equipment.

This invention accordingly provides a method of continuously passing a resilient tube of thermoplastic material between nip rollers, wherein one edge of the tube is supported internally while the tube passes between the nip, the tube thereby being reduced to a substantially flattened condition, the support being provided by means of a stationary probe within the tube, which probe is located at the side of and outside the nip, so that the tendency of the tube to be creased at that edge is reduced.

The opposite edge of the tube may pass between the nip, or it may project slightly outside the nip or it may be supported in a similar manner to the other edge. In the first of these three cases, the edge passing between the nip may become creased but this may not be a disadvantage if the tube is subsequently slit along that edge and opened out since a crease-free sheet may then be obtained. In the second case, where the unsupported edge projects outside the nip it should preferably only project far enough to avoid creasing that edge, since, if a substantial width of tubing projects, a substantially gas-tight seal, which is desired in the preferred way of operating our invention, may not be obtained between the portions of the tube before and after passing through the nip.

It is to be preferred, however, that both edges of the tube are supported internally on probes located inside the tube and at the side of the nip.

Further in accordance with the present invention we provide apparatus for passing a tube of thermoplastic material between nip rollers comprising a pair of substantially parallel nip rollers spaced apart to such an extent that a tube is flattened when it is passed therebetween and a stationary probe located at the side of and outside the line of the nip, said probe lying substantially in a plane perpendicular to the plane of the axes of the nip rollers and along a line perpendicular to the line of the nip.

We further provide apparatus in which there is a probe at each side of the nip. The probe or probes should be substantially perpendicular to the line of the nip and to the plane of the axes of the nip rollers so that the tube is supported by the probe or probes only at the line of the nip.

The invention is preferably applied to continuously passing the said tube between nip rolls, and admitting a fluid, normally air, to within the tube after it has passed through the nip. Such admission is conveniently through the stationary probe or through one of the probes if there is more than one probe. The probe is provided with an internal conduit for the purpose. The admisison of fluid may however be carried out through an additional stationary probe which passes through the nip within the tube, the additional probe being provided with an internal conduit for this purpose. This additional probe should preferably be elliptical or eye-shaped in cross-section in order to provide the minimum distortion of the flattened tube. In this case the nip rollers are adapted to allow the passage of the additional probe, for instance, as in British specification 787,479, by providing one or both of the nip rollers with grooves into which the probe fits, and preferably filling the grooves with sponge rubber. The invention may, however, be applied to, for instance, the controlled haul-off of a tube from a die where no admission of fluid beyond the nip is required. In this event where only one probe is used according to the present invention there is of course no problem of preventing leakage of fluid from one side of the nip to the other.

Where it is desired to reduce leakage of any admitted fluid from one side of the nip to the other, the or each probe supporting an edge of the tube is preferably located immediately adjacent to the nip formed by the nip rollers so that the tube is held sufficiently tightly against the or each probe by the portion thereof being flattened by the nip rollers.

The invention as applied to continuously passing the tube between nip rollers and admitting a fluid to within the tube after it has passed through the nip, may be further applied to the manufacture of tubular thermoplastic film. In such manufacture a thermoplastic tube may be melt extruded from a die, cooled to below the melting point at least to the extent that it does not adhere to itself or to the probe or probes and nip rollers according to this invention, passed through the said nip rollers, heated to a temperature suitable for stretch orienting the tube, the tube is inflated by gaseous pressure to stretch orient it and produce thermoplastic tubular film, and finally hauled off by further nip rollers which serve to prevent escape of inflating gas. The probe or probes are then attached to the die, and conduits for the supply of inflating gas pass through the die and down a probe.

As the tube has its greatest width where it is flattened, i.e. at the nip, it will be apparent that the probe or probes located outside the nip according to this invention will not be at the same distance from the longitudinal axis of the tube over its or their entire length but will lie at a maximum distance from this axis at the nip and at smaller distances therefrom above and below the nip, i.e. the probe should be appropriately curved.

Although the invention is primarily intended for use with thick-walled tubes, the invention is not so limited since it has also been found to work well with relatively thin-walled tubes, for instance those of wall thickness of less than 0.01 inch.

The method of the invention is particularly applied to the manufacture of tubular thermoplastic films of polymers of propylene which are at least 75% insoluble in boiling n-heptane, such as the well known (isotactic) polypropylene. Such polymers are conveniently stretched to a high stretch ratio when oriented and hence require the production of thick-walled resilient plastic tubes. These thick-walled tubes may have a wall thickness of from 0.01 to 0.1 inch or even greater.

Although primarily intended for use in a process for the production of polypropylene film, the invention may equally well be applied to the production of films of any other organic thermoplastic material that can be extruded in a tubular form, especially when it is necessary to flatten a thick-walled resilient plastic tube which is liable to creasing or cracking at a flattened edge. Such materials include, for example: polythene; linear film-forming super polyesters such as polyethylene terephthalate; linear superpolyamides; certain vinyl polymers and copolymers such as polyvinyl chloride, polystyrene, polyvinylidene chloride and vinyl chloride/vinylidene chloride copolmers; and cellulose derivatives such as cellulose acetate. Our invention also extends to tubular thermoplastic film made according to our process and to double-width film and single-width film made by slitting such tubular film by one or two longitudinal cuts respectively.

A method for the production of tubular polypropylene film in accordance with the invention will now be described by way of example and with reference to the accompanying drawings, wherein.

Figure 1:
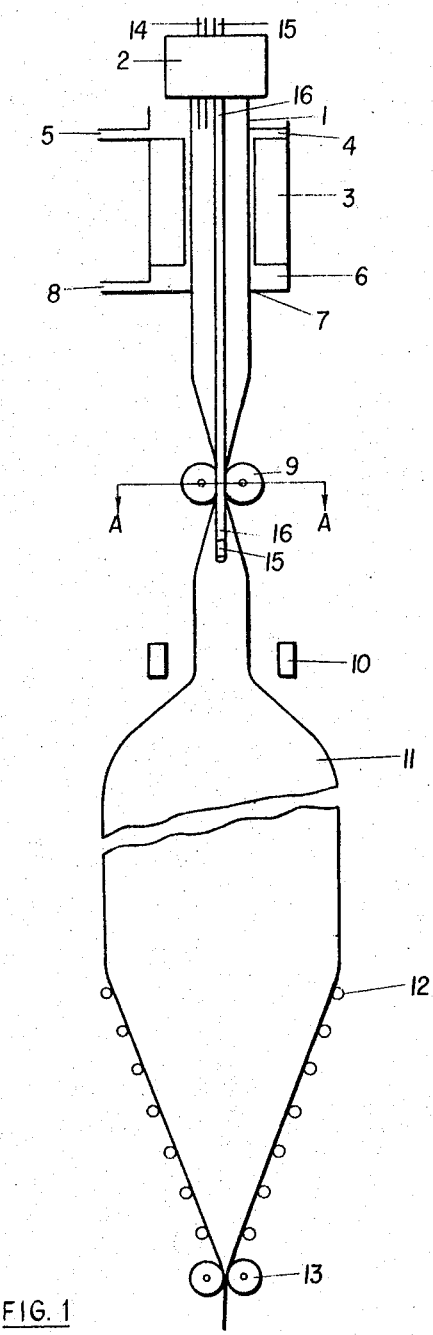
FIGURE 1 is a diagrammatic elevation illustrating the manufacture of tubular film by downward extrusion.

In FIGURE 1 a tube 1 of isotactic polypropylene (solubility in n-heptane less than 2%) is melt extruded from a die 2 and passed through a sizing die 3 with water 4 lubrication supplied through the pipe 5. The water is removed by a vacuum device 6 having a ring seal 7 and pipe 8 for application of vacuum. The tube 1 is then passed between nip rollers 9, past infra-red heaters 10 which heat it to the orientation temperature, is stretched and the tubular film 11 produced is flattened by guides 12 and hauled off by further nip rollers 13. A conduit 14 passing through the die 2 supplies gaseous pressure at somewhat above atmospheric pressure to assist sizing by the sizing die 3. Attached to the die is a probe 15 having a conduit within which the gaseous pressure for inflation is supplied after the tube has passed through the nip rollers 9. A solid probe 16 in front of the probe 15 is also attached to the die.

Figure 2:
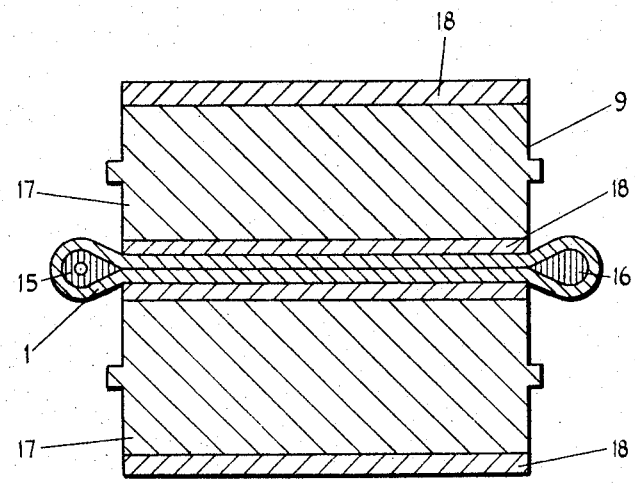
FIGURE 2 is a cross-section along the line A—A of FIGURE 1 showing the arrangement of a probe at each edge of the tube and FIGURE 3 is a cross-section of an alternative to FIGURE 2 in which the probes at the edges of the tube are solid and there is provided an additional hollow probe for the admission of gas.

In FIGURE 2 the nip rollers 9 are provided with a steel core 17 covered with relatively hard rubber sections 18. The solid pear-shaped probe 16 passes outside the nip at one edge of the tube 1 while the pear-shaped probe 15 having a conduit passes outside the other edge.

Figure 3:
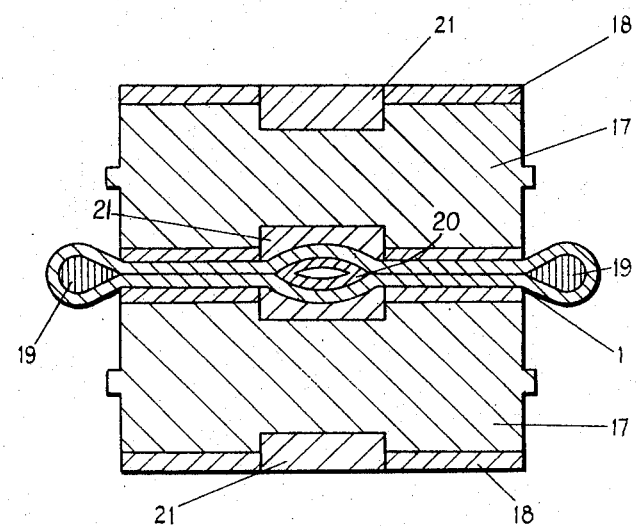

In FIGURE 3 both probes 19 at the edge of the tube 1 are solid and there is provided, in addition to them, a hollow eye-shaped probe 20 through which inflating gas may be passed. The centre portion 21 of the core 17 of the rollers 9 is covered with sponge rubber to provide a close fit of the roller over the tube as it passes over the probe 20.

Figure 4:
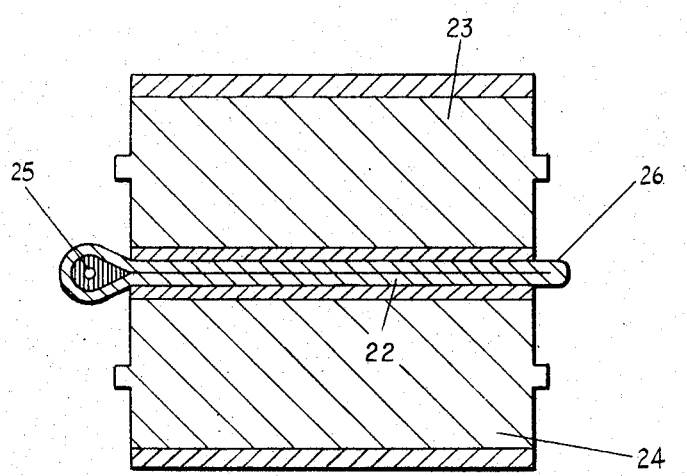
FIGURE 4 is a cross-section of a second alternative in which there is only one probe.

In FIGURE 4 the thick-walled tube 22 is passed between the nip formed by a pair of rubber coated rollers 23, 24. At one side of the nip is located a probe 25 inside the tube 22. Probe 25 has a conduit inside to supply gaseous pressure for inflation of the tube after the latter has passed through the nip rollers. The remainder of tube 22 is flattened between the nip rollers except for the edge 26 of the tube which projects outside the nip rollers so that the edge is not creased.

An advantage of the absence of sharp creases made by wholly flattening the tube arises from the absence of substantial weaknesses at the site of creases in the final film. This permits tubular "lay flat" film produced to be slit at one edge only and the slit film to be opened out to give double width "flat" film. In this way the size of the inflated tubular film may be halved for the same width of "flat" film (compared with the case in which "lay flat" film is slit at both edges because of weaknesses at the edges due to creasing of the tube caused by the nip rollers). A further advantage is that in the simplest form of our invention, as illustrated for instance in FIGURES 2 and 4, ordinary nip rollers may be used without the necessity of forming grooves therein as in previous proposals.

We claim:

1. A method of continuously passing a resilient tube of thermoplastic material between nip rollers, which comprises internally supporting at least one edge of the tube while the tube passes between the nip and is thereby reduced to a substantially flattened condition, the support being provided by means of at least one stationary probe within the tube, which probe is located at the side of and outside the nip, so that the tendency of the tube to be creased at that edge is reduced.

2. A method according to claim 1 which comprises internally supporting each edge of the tube on said stationary probes.

3. A method according to claim 1 which comprises internally supporting one edge only of the tube on a said stationary probe and passing the other edge of the tube through the nip.

4. A method according to claim 1 which comprises internally supporting one edge only of the tube on a stationary probe and allowing the other edge of the tube to project outside the nip by an amount which permits a substantially gas-tight seal to be maintained between the portions of the tube before and after passing through the nip.

5. A method according to claim 1 in which each stationary probe supporting an edge of the tube is located immediately adjacent to the nip.

6. A method according to claim 1 in which the tube has a wall thickness of from 0.01 to 0.1 inch.

7. A method according to claim 1 in which the thermoplastic material is polypropylene.

8. A method of continuously passing a resilient tube of thermoplastic material between nip rollers according to claim 1 which comprises admitting an inflating fluid to within the tube through an internal conduit provided for that purpose in said stationary probe, and inflating the tube after it has passed through the nip.

9. A method of continuously passing a resilient tube of thermoplastic material between nip rollers according to claim 1 which comprises admitting an inflating fluid to within the tube through an internal conduit provided for that purpose in an additional probe, which additional probe passes through the nip within the tube, and inflating the tube after it has passed through the nip.

10. Apparatus suitable for continuously passing a resilient tube of thermoplastic material between nip rollers so that the tendency of the tube to be creased at one of its edges is reduced, comprising a pair of substantially parallel nip rollers spaced apart to such an extent that a tube is flattened when it is passed therebetween, and at least one stationary probe located at the side of and outside the line of the nip, said probe lying substantially in a plane perpendicular to the plane of the axes of the nip rollers and along a line perpendicular to the line of the nip.

11. Apparatus according to claim 10 comprising a pair of substantially parallel nip rollers spaced apart to such an extent that a tube is flattened when it is passed therebetween and, at each side of and outside the line of the nip, a stationary probe lying substantially in a plane perpendicular to the plane of the axes of the nip rollers and along a line perpendicular to the line of the nip.

12. Apparatus according to claim 10 in which each stationary probe is located immediately adjacent to the line of the nip.

13. Apparatus according to claim 10 in which each said stationary probe is provided with an internal longitudinal conduit.

14. Apparatus according to claim 10 in which a further probe provided with an internal longitudinal conduit is located between the nip rollers.

15. Apparatus according to claim 10 in which at least one of the nip rollers is circumferentialy grooved and a further probe provided with an internal longitudinal conduit is located in said groove, said groove being lined with a resilient substance.

16. Apparatus according to claim 15 in which both nip rollers are circumferentially grooved.

17. Apparatus according to claim 10 in which one or both nip rollers are covered with a resilient substance.

18. A process for the continuous production of a tube of a thermoplastic material which comprises melt extruding a resilient tube of the thermoplasaic material from an annular die, cooling the tube to below the melting point of the thermoplastic material at least to the extent that it does not adhere to itself or to a metal or rubber surface, and passing the tube through a pair of nip rollers which reduce the tube to a substantially flattened condition, while internally supporting at least one edge of the tube, by means of at least one stationary probe located within the tube and at the side of and outside the nip.

19. A process according to claim 18 which comprises inflating the tube after it has passed through the nip rollers in order to stretch it.

20. A process according to claim 18 which comprises heating the tube after it has passed through the nip rollers to a temperature suitable for stretch orienting the tube and thereafter inflating the heated tube in order to stretch it.

References Cited by the Examiner
FOREIGN PATENTS 308,956  10/1955  Switzerland.

ALEXANDER H. BRODMERKEL, *Primary Examiner.*

ROBERT F. WHITE, *Examiner.*

F. S. WHISENHUNT, Jr., D. J. ARNOLD,
*Assistant Examiners.*